US008258234B2

(12) United States Patent
Lohmeijer et al.

(10) Patent No.: US 8,258,234 B2
(45) Date of Patent: Sep. 4, 2012

(54) PROCESS FOR PREPARING AN AQUEOUS COMPOSITE-PARTICLE DISPERSION

(75) Inventors: Bas Lohmeijer, Mannheim (DE); Arno Tuchbreiter, Speyer (DE); Harm Wiese, Laudenbach (DE)

(73) Assignee: BASF SE, Ludwigshafen (DE)

( * ) Notice: Subject to any disclaimer, the term of this patent is extended or adjusted under 35 U.S.C. 154(b) by 127 days.

(21) Appl. No.: 12/681,645

(22) PCT Filed: Oct. 17, 2008

(86) PCT No.: PCT/EP2008/064075
§ 371 (c)(1),
(2), (4) Date: Apr. 5, 2010

(87) PCT Pub. No.: WO2009/053317
PCT Pub. Date: Apr. 30, 2009

(65) Prior Publication Data
US 2010/0216942 A1  Aug. 26, 2010

(30) Foreign Application Priority Data
Oct. 24, 2007 (EP) .................................. 07119197

(51) Int. Cl.
*C08K 3/36* (2006.01)
(52) U.S. Cl. ....................... 524/789; 523/202
(58) Field of Classification Search .................. 524/789; 523/202
See application file for complete search history.

(56) References Cited

U.S. PATENT DOCUMENTS

| | | | |
|---|---|---|---|
| 3,544,500 | A | 12/1970 | Osmond |
| 4,269,749 | A | 5/1981 | Marriott et al. |
| 4,421,660 | A | 12/1983 | Solc nee Hajna |
| 4,608,401 | A | 8/1986 | Martin |
| 4,981,882 | A | 1/1991 | Smith et al. |
| 5,856,379 | A * | 1/1999 | Shiratsuchi et al. ........ 523/209 |
| 2004/0077768 | A1 | 4/2004 | Greenwood |
| 2004/0177768 | A1 | 9/2004 | Rubin |
| 2009/0317626 | A1 | 12/2009 | Tiarks et al. |

FOREIGN PATENT DOCUMENTS

| | | |
|---|---|---|
| DE | 383473 | 10/1923 |
| DE | 44 02 408 | 8/1995 |
| DE | 44 19 518 | 12/1995 |
| EP | 0 104 498 | 4/1984 |
| EP | 0 505 230 | 9/1992 |
| EP | 0 572 128 | 12/1993 |
| EP | 0 767 180 | 4/1997 |
| GB | 2 227 739 | 8/1990 |
| WO | 01 18081 | 3/2001 |
| WO | 01 29106 | 4/2001 |
| WO | 02 24756 | 3/2002 |
| WO | 02 24758 | 3/2002 |
| WO | 03 000760 | 1/2003 |
| WO | 2006 072464 | 7/2006 |

OTHER PUBLICATIONS

Brandrup (Polymer Handbook, 2nd Ed., Wiley-Interscience, (1975) III-144 and III-145).*
Fu, Long et al., "Study on Encapsulation of Organic Polymers in the Presence of Inorganic Sol Particles", I. Synthesis of Encapsulation Micro-Particles by Electrostatic Interaction Method, Journal of Tianjin University, No. 4, pp. 10-15, (1991).
Paulke, Bernd-R. et al., "Synthesis Studies on Paramagnetic Polystyrene Latex Particles", Proceedings of an International Conference on Scientific and Clinical Applications of Magnetic Carriers, pp. 69-76, ISBN 0-306-45687-7, (1997).
Bourgeat-Lami, E. et al., "Emulsion polymerization in the presence of colloidal silica particles", Application to the reinforcement of poly(ethyl acrylate) films, Die Angewandte Makromolekulare Chemie, vol. 242, pp. 105-122, (Nr. 4229), (1996).
Voorn, D.J. et al., "Clay Platelets Encapsulated Inside Latex Particles", Macromolecules, vol. 39, No. 14, pp. 4654-4656, (2006).
Negrete-Herrera, Norma et al., "Synthesis of polymer/Laponite nanocomposite latex particles via emulsion polymerization using silylated and cation-exchanged Laponite clay platelets", Progress in Solid State Chemistry, vol. 34, pp. 121-137, (2006).
Armes, S.P. et al., "Synthesis of Novel Polymer-Silica Colloidal Nanocomposites via Free-Radical Polymerization of Vinyl Monomers", Advanced Materials, vol. 11, No. 5, pp. 408-410, (1999).
U.S. Appl. No. 12/598,202, filed Oct. 30, 2009, Tuchbreiter, et al.
U.S. Appl. No. 12/996,306, filed Dec. 3, 2010, Bette, et al.
U.S. Appl. No. 13/061,644, filed Mar. 1, 2011, Lohmeijer, et al.
U.S. Appl. No. 13/257,673, filed Sep. 20, 2011, Lohmeijer, et al.
U.S. Appl. No. 13/375,934, filed Dec. 2, 2011, Lohmeijer.

* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

A process for preparing aqueous dispersions of composite particles using nonpolymerizable silane compounds.

18 Claims, No Drawings

PROCESS FOR PREPARING AN AQUEOUS COMPOSITE-PARTICLE DISPERSION

DESCRIPTION

The present invention relates to a process for preparing an aqueous dispersion of particles composed of addition polymer and finely divided inorganic solid (aqueous composite-particle dispersion), in which process ethylenically unsaturated monomers are dispersely distributed in aqueous medium and polymerized by the method of free-radical aqueous emulsion polymerization by means of at least one free-radical polymerization initiator in the presence of at least one dispersely distributed, finely divided inorganic solid and at least one dispersant, wherein a) the inorganic solid has an average particle diameter of $>0$ nm and $\leq 100$ nm,
b) 1 to 1000 parts by weight of inorganic solid are used per 100 parts by weight of monomers,
c) 0.01 to 10 parts by weight of a silicon-containing compound (silane compound) are used per 100 parts by weight of monomers, the silane compound having at least one Si—OH group or at least one functional group which is hydrolyzed in deionized water at a temperature $\leq 100°$ C. to form an Si—OH or an Si—O—Si group, and the silane compound having no free-radically copolymerizable ethylenically unsaturated group, and
d) at least a portion of the inorganic solid is included in an initial charge in an aqueous polymerization medium in the form of an aqueous dispersion of solids, then
e) at least a portion of the silane compound is metered into the aqueous polymerization medium over a period of $\geq 5$ and $\leq 240$ minutes, subsequently
f) if appropriate $\leq 20\%$ by weight of the monomers are added to the aqueous polymerization medium and free-radically polymerized, and subsequently
g) any remainder of the inorganic solid, any remainder of the silane compound, any remainder or the total amount of the monomers are metered into the aqueous polymerization medium under polymerization conditions.

The present invention likewise relates to the aqueous composite-particle dispersions obtainable by the process of the invention and to their use, and also to the composite-particle powders obtainable from the aqueous composite-particle dispersions and to their use.

Aqueous composite-particle dispersions are a matter of general knowledge. They are fluid systems comprising in disperse distribution, in the aqueous dispersion medium, addition-polymer coils, consisting of a plurality of interwoven addition-polymer chains, referred to as the polymer matrix, and particles of finely divided inorganic solid (composite particles). The average diameter of the composite particles is generally in the range $\geq 10$ nm and $\leq 1000$ nm, often in the range $\geq 50$ nm and $\leq 400$ nm, and frequently in the range $\geq 100$ nm and $\leq 300$ nm.

Composite particles and processes for preparing them in the form of aqueous composite-particle dispersions, and also their use, are known to the skilled worker and are disclosed for example in the specifications U.S. Pat. Nos. 3,544,500, 4,421,660, 4,608,401, 4,981,882, EP-A 104 498, EP-A 505 230, EP-A 572 128, GB-A 2 227 739, WO 01/18081, WO 01/29106, WO 03/000760, and WO 06/072464 and also in Long et al., Tianjin Daxue Xuebao 1991, 4, pages 10 to 15, Bourgeat-Lami et al., Die Angewandte Makromolekulare Chemie 1996, 242, pages 105 to 122, Paulke et al., Synthesis Studies of Paramagnetic Polystyrene Latex Particles in Scientific and Clinical Applications of Magnetic Carriers, pages 69 to 76, Plenum Press, New York, 1997, and Armes et al., Advanced Materials 1999, 11, No. 5, pages 408 to 410.

The prior art relevant for the present invention is as follows.

Van Herk et al. in Macromolecules 2006, 39, pages 4654 to 4656 disclose the encapsulation of phyllosilicates, including phyllosilicates modified covalently with silane monomers, in latex particles by what is called the "starved-feed" emulsion polymerization method under emulsifier-free conditions. The phyllosilicates there are modified in dichloromethane and worked up over a plurality of operating steps before being deployed in the emulsion polymerization.

Bourgeat-Lami et al. in Progress in Solid State Chemistry 2006, 34, pages 121 to 137 describe the hydrophobically covalent modification of phyllosilicates in toluene, and their purification and subsequent deployment in emulsion polymerization.

WO 02/24756 discloses the use of hydrophobicized phyllosilicates in suspension polymerization and miniemulsion polymerization.

Furthermore, WO 02/24758 discloses the use of "easily modified" hydrophobicized phyllosilicates in emulsion polymerization, although the specific modification is not described.

US-A 2004/77768 discloses the silanization of silica sols with organic silane compounds. That silanization takes place by means of aqueous solutions of the organic silane compounds at a temperature $<50°$ C. Depending on the silica sols used and on the organic silane compounds, the mixing time may be up to 3 hours, although preference is given to mixing times $<5$ minutes and more particularly $<1$ minute. The silanized silica sols obtained can be blended with organic binders in a downstream step, and the resulting binding mixtures can be used in a wide variety of different fields of application.

The unpublished European patent application with the file reference 07107552.7 discloses the use of ethylenically unsaturated monomers comprising silicon-containing groups for preparing aqueous composite-particle dispersions.

It was an object of the present invention to provide a new preparation process for stable aqueous composite-particle dispersions, using an uncopolymerizable organic silicon compound.

The process of the invention uses clear water, such as clear drinking water, for example, but, with particular advantage, deionized water, whose total amount is $\geq 30\%$ and $\leq 99\%$ and advantageously $\geq 35\%$ and $\leq 95\%$, and with particular advantage $\geq 40\%$ and $\leq 90\%$, by weight, based on the aqueous composite-particle dispersion. In accordance with the invention at least a portion of the water is included in an initial charge in the polymerization vessel in step d) of the process and any remainder is metered in at least one of the following steps e) to g) of the process. Advantageously the addition of any remainder of water takes place in steps f) and g) of the process, preferably step g) of the process.

Finely divided inorganic solids suitable for the process of the invention are in principle all those which have an average particle diameter of $>0$ and $\leq 100$ nm.

Finely divided inorganic solids which can be used in accordance with the invention are in principle metals, metal compounds, such as metal oxides and metal salts, and also semimetal compounds and nonmetal compounds. Finely divided metal powders which can be used are noble metal colloids, such as palladium, silver, ruthenium, platinum, gold, and rhodium, for example, and their alloys. Examples that may be mentioned of finely divided metal oxides include titanium dioxide (commercially available, for example, as HOMBITEC® grades from Sachtleben Chemie GmbH), zirconium (IV) oxide, tin(II) oxide, tin(IV) oxide (commercially available, for example, as NYACOL® SN grades from Akzo-Nobel), aluminum oxide (commercially available, for example, as NYACOL® AL grades from Akzo-Nobel), barium oxide, magnesium oxide, various iron oxides, such as iron(II) oxide (wuestite), iron(III) oxide (hematite) and iron (II/III) oxide (magnetite), chromium(III) oxide, antimony (III) oxide, bismuth(III) oxide, zinc oxide (commercially available, for example, as SACHTOTEC® grades from Sachtleben Chemie GmbH), nickel(II) oxide, nickel(III) oxide, cobalt(II) oxide, cobalt(III) oxide, copper(II) oxide, yttrium(III) oxide (commercially available, for example, as NYACOL® YTTRIA grades from Akzo-Nobel), cerium(IV) oxide (commercially available, for example, as NYACOL® CEO2 grades from Akzo-Nobel), amorphous and/or in their different crystal modifications, and also their hydroxy oxides, such as, for example, hydroxytitanium(IV) oxide, hydroxyzirconium(IV) oxide, hydroxyaluminum oxide (commercially available, for example, as DISPERAL® grades from Condea-Chemie GmbH) and hydroxyiron(III) oxide, amorphous and/or in their different crystal modifications. The following metal salts, amorphous and/or in their different crystal structures, can be used in principle in the process of the invention: sulfides, such as iron(II) sulfide, iron(III) sulfide, iron(II) disulfide (pyrite), tin(II) sulfide, tin(IV) sulfide, mercury(II) sulfide, cadmium(II) sulfide, zinc sulfide, copper(II) sulfide, silver sulfide, nickel(II) sulfide, cobalt(II) sulfide, cobalt(III) sulfide, manganese(II) sulfide, chromium(III) sulfide, titanium(II) sulfide, titanium(III) sulfide, titanium(IV) sulfide, zirconium(IV) sulfide, antimony(III) sulfide, and bismuth(III) sulfide, hydroxides, such as tin(II) hydroxide, aluminum hydroxide, magnesium hydroxide, calcium hydroxide, barium hydroxide, zinc hydroxide, iron(II) hydroxide, and iron(III) hydroxide, sulfates, such as calcium sulfate, strontium sulfate, barium sulfate, and lead(IV) sulfate, carbonates, such as lithium carbonate, magnesium carbonate, calcium carbonate, zinc carbonate, zirconium(IV) carbonate, iron(II) carbonate, and iron(III) carbonate, orthophosphates, such as lithium orthophosphate, calcium orthophosphate, zinc orthophosphate, magnesium orthophosphate, aluminum orthophosphate, tin(III) orthophosphate, iron(II) orthophosphate, and iron(III) orthophosphate, metaphosphates, such as lithium metaphosphate, calcium metaphosphate, and aluminum metaphosphate, pyrophosphates, such as magnesium pyrophosphate, calcium pyrophosphate, zinc pyrophosphate, iron(III) pyrophosphate, and tin(II) pyrophosphate, ammonium phosphates, such as magnesium ammonium phosphate, zinc ammonium phosphate, hydroxylapatite [$Ca_5\{(PO_4)_3OH\}$], orthosilicates, such as lithium orthosilicate, calcium/magnesium orthosilicate, aluminum orthosilicate, iron(II) orthosilicate, iron(III) orthosilicate, magnesium orthosilicate, zinc orthosilicate, zirconium(III) orthosilicate and zirconium(IV) orthosilicate, metasilicates, such as lithium metasilicate, calcium/magnesium metasilicate, calcium metasilicate, magnesium metasilicate, and zinc metasilicate, phyllosilicates, such as sodium aluminum silicate and sodium magnesium silicate, especially in spontaneously delaminating form, such as, for example, OPTIGEL® SH and OPTIGEL® EX 0482 (trademarks of Südchemie AG), SAPONIT® SKS-20 and HEKTORIT® SKS 21 (trademarks of Hoechst AG), and LAPONITE®RD and LAPONITE® GS (trademarks of Rockwood Holdings, Inc.), aluminates, such as lithium aluminate, calcium aluminate, and zinc aluminate, borates, such as magnesium metaborate and magnesium orthoborate, oxalates, such as calcium oxalate, zirconium (IV) oxalate, magnesium oxalate, zinc oxalate, and aluminum oxalate, tartrates, such as calcium tartrate, acetylacetonates, such as aluminum acetylacetonate and iron(III) acetylacetonate, salicylates, such as aluminum salicylate, citrates, such as calcium citrate, iron(II) citrate, and zinc citrate, palmitates, such as aluminum palmitate, calcium palmitate, and magnesium palmitate, stearates, such as aluminum stearate, calcium stearate, magnesium stearate, and zinc stearate, laurates, such as calcium laurate, linoleates, such as calcium linoleate, and oleates, such as calcium oleate, iron(II) oleate or zinc oleate.

As an essential semimetal compound which can be used in accordance with the invention, mention may be made of amorphous silicon dioxide and/or silicon dioxide present in different crystal structures. Silicon dioxide suitable in accordance with the invention is commercially available and can be obtained, for example, as AEROSIL® (trademark of Degussa AG), LEVASIL® (trademark of Bayer AG), LUDOX® (trademark of DuPont), NYACOL® and BINDZIL® (trademarks of Akzo-Nobel), and SNOWTEX® (trademark of Nissan Chemical Industries, Ltd.). Nonmetal compounds suitable in accordance with the invention are, for example, colloidal graphite or diamond.

Particularly suitable finely divided inorganic solids are those whose solubility in water at 20° C. and 1.013 bar (absolute) is $\leq 1$ g/l, preferably $\leq 0.1$ g/l and, in particular, $\leq 0.01$ g/l. Particular preference is given to compounds selected from the group comprising silicon dioxide, aluminum oxide, tin (IV) oxide, yttrium(III) oxide, cerium(IV) oxide, hydroxyaluminum oxide, calcium carbonate, magnesium carbonate, calcium orthophosphate, magnesium orthophosphate, calcium metaphosphate, magnesium metaphosphate, calcium pyrophosphate, magnesium pyrophosphate, orthosilicates, such as lithium orthosilicate, calcium/magnesium orthosilicate, aluminum orthosilicate, iron(II) orthosilicate, iron(III) orthosilicate, magnesium orthosilicate, zinc orthosilicate, zirconium(III) orthosilicate, and zirconium(IV) orthosilicate, metasilicates, such as lithium metasilicate, calcium/magnesium metasilicate, calcium metasilicate, magnesium metasilicate, and zinc metasilicate, phyllosilicates, such as sodium aluminum silicate and sodium magnesium silicate, especially in spontaneously delaminating form, such as, for example, products from the series including NANOFIL®, OPTIGEL®, CLOSITE® (trademarks of Südchemie AG), SOMASIF®, LUCENTITE® (trademarks of CBC Japan Co., Ltd), SAPONIT®, HEKTORIT® (trademarks of Hoechst AG) and LAPONITE® (trademark of Rockwood Holdings, Inc.), or iron(II) oxide, iron(III) oxide, iron(II/III) oxide, titanium dioxide, hydroxylapatite, zinc oxide, and zinc sulfide.

Preferably the at least one finely divided inorganic solid is selected from the group comprising silicon dioxide, phyllosilicates, aluminum oxide, hydroxyaluminum oxide, calcium carbonate, magnesium carbonate, calcium orthophosphate, magnesium orthophosphate, iron(II) oxide, iron(III) oxide, iron(II/III) oxide, tin(IV) oxide, cerium(IV) oxide, yttrium (III) oxide, titanium dioxide, hydroxylapatite, zinc oxide, and zinc sulfide.

Particular preference is given to silicon compounds, such as pyrogenic (fumed) silica, colloidal silica, and/or phyllosilicates.

In the processes of the invention it is also possible to use with advantage the commercially available compounds of the AEROSIL®, LEVASIL®, LUDOX®, NYACOL®, and BINDZIL® grades (silicon dioxide), NANOFIL®, OPTIGEL®, SOMASIF®, CLOISITE®, LUCENTITE®, SAPONIT®, HEKTORIT®, and LAPONITE® grades (phyllosilicates), DISPERAL® grades (hydroxyaluminum oxide), NYACOL® AL grades (aluminum oxide), HOMBITEC® grades (titanium dioxide), NYACOL® SN grades (tin(IV) oxide), NYACOL® YTTRIA grades (yttrium(III) oxide), NYACOL® CEO2 grades (cerium(IV) oxide), and SACHTOTEC® grades (zinc oxide).

The finely divided inorganic solids which can be used to prepare the composite particles have particles which, dispersed in the aqueous polymerization medium, have a particle diameter of $\leq 100$ nm. Finely divided inorganic solids used successfully are those whose dispersed particles have a particle diameter >0 nm but $\leq 90$ nm, $\leq 80$ nm, $\leq 70$ nm, $\leq 60$ nm, $\leq 50$ nm, $\leq 40$ nm, $\leq 30$ nm, $\leq 20$ nm or $\leq 10$ nm and all values in between. With advantage, finely divided inorganic solids are used which have a particle diameter $\leq 50$ nm.

The determination of the particle size of the finely divided inorganic solid and also of the composite particles obtainable by the process of the invention takes place for the purposes of this specification generally by the method of quasielastic light scattering (DIN ISO 13321) using a High Performance Particle Sizer (HPPS) from Malvern Instruments Ltd.

The obtainability of finely divided solids is known in principle to the skilled worker and they are obtained, for example, by precipitation reactions or chemical reactions in the gas phase (on this point cf. E. Matijevic, Chem. Mater. 5 (1993) pages 412 to 426; Ullmann's Encyclopedia of Industrial Chemistry, Vol. A 23, pages 583 to 660, Verlag Chemie, Weinheim, 1992; D. F. Evans, H. Wennerström in The Colloidal Domain, pages 363 to 405, Verlag Chemie, Weinheim, 1994, and R. J. Hunter in Foundations of Colloid Science, Vol. I, pages 10 to 17, Clarendon Press, Oxford, 1991).

The finely divided inorganic solids may be used in this case according to the invention either in the form of powders or in the form of stable aqueous dispersions of solids, known as sols.

The stable aqueous dispersions of solids are often prepared directly during synthesis of the finely divided inorganic solids in aqueous medium or else by dispersing the finely divided inorganic solid into the aqueous medium. Depending on the way in which said finely divided inorganic solids are prepared, this is done either directly, in the case, for example, of precipitated or pyrogenic silicon dioxide, aluminum oxide, etc., or by using appropriate auxiliary devices, such as dispersers or ultrasound sonotrodes, for example.

Stable aqueous dispersions of solids are understood to mean those aqueous dispersions of solids which at an initial solids concentration of $\geq 0.1\%$ by weight, based on the aqueous dispersion of solids, still comprise in dispersed form one hour after their preparation or after homogeneous dispersing of the sedimented finely divided solids, without further stirring or shaking, more than 90% by weight of the originally dispersed solid.

The quantitative determination of the initial solids concentration and of the solids concentration after one hour takes place for the purposes of this specification by the method of analytical ultracentrifugation (cf. on this point S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175).

Based on 100 parts by weight of the total ethylenically unsaturated monomers used (total monomer amount), use is made according to the invention of 0.1 to 1000 advantageously 1 to 100, and with particular advantage 2 to 70 parts by weight of the inorganic solid.

In step d) of the process of the invention at least a portion, advantageously $\geq 10\%$, $\geq 30\%$ or $\geq 50\%$ by weight, and with particular advantage $\geq 60\%$, $\geq 70\%$, $\geq 80\%$ or $\geq 90\%$ by weight, of the total amount of the inorganic solid is included in the initial charge in the aqueous polymerization medium to form an aqueous solids dispersion. Any remainder of inorganic solid is metered into the aqueous polymerization medium in step g) of the process under polymerization conditions, discontinuously in one or more portions or continuously at a constant or a varying volume flow rate, more particularly in the form of a stable aqueous solids dispersion. With advantage, however, in step d) of the process the total amount of the inorganic solid is included, in the form of an aqueous solids dispersion, in the initial charge in the aqueous polymerization medium. If the inorganic solid is used in powder form, then it may be advantageous to disperse the finely divided solids powder in the aqueous polymerization medium by using appropriate auxiliary devices, such as stirrers, dispersers or ultrasound sonotrodes, for example.

For preparing the aqueous composite-particle dispersions, dispersants used are generally those which maintain not only the finely divided inorganic solid particles but also the monomer droplets and the resulting composite particles in disperse distribution in the aqueous polymerization medium and so ensure the stability of the aqueous dispersions of composite particles that are produced. Suitable dispersants include both the protective colloids commonly used to carry out free-radical aqueous emulsion polymerizations, and emulsifiers.

An exhaustive description of suitable protective colloids is given in Houben-Weyl, Methoden der organischen Chemie, Volume XIV/1, Makromolekulare Stoffe [Macromolecular compounds], Georg-Thieme-Verlag, Stuttgart, 1961, pages 411 to 420.

Examples of suitable neutral protective colloids are polyvinyl alcohols, polyalkylene glycols, cellulose derivatives, starch derivatives, and gelatin derivatives.

Suitable anionic protective colloids, i.e., protective colloids whose dispersive component has at least one negative electrical charge, are for example polyacrylic acids and polymethacrylic acids and their alkali metal salts, copolymers comprising acrylic acid, methacrylic acid, 2-acrylamido-2-methylpropanesulfonic acid, 4-styrenesulfonic acid and/or maleic anhydride, and the alkali metal salts of such copolymers, and also alkali metal salts of sulfonic acids of high molecular mass compounds such as, for example, polystyrene.

Suitable cationic protective colloids, i.e., protective colloids whose dispersive component has at least one positive electrical charge, are, for example, the N-protonated and/or N-alkylated derivatives of homopolymers and copolymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-functional acrylates, methacrylates, acrylamides and/or methacrylamides.

It is of course also possible to use mixtures of emulsifiers and/or protective colloids. As dispersants it is common to use exclusively emulsifiers, whose relative molecular weights, unlike those of the protective colloids, are usually below 1500 g/mol. Where mixtures of surface-active substances are used the individual components must of course be compatible with one another, which in case of doubt can be checked by means of a few preliminary experiments. An overview of suitable emulsifiers is given in Houben-Weyl, Methoden der organischen Chemie, Volume XIV/1, Makromolekulare Stoffe [Macromolecular compounds], Georg-Thieme-Verlag, Stuttgart, 1961, pages 192 to 208.

Customary nonionic emulsifiers are for example ethoxylated mono-, di- and tri-alkylphenols (EO units: 3 to 50, alkyl: $C_4$ to $C_{12}$) and ethoxylated fatty alcohols (EO units: 3 to 80;

alkyl: $C_8$ to $C_{36}$). Examples thereof are the Lutensol® A grades ($C_{12}C_{14}$ fatty alcohol ethoxylates, EO units: 3 to 8), LUTENSOL® AO grades ($C_{13}C_{15}$ oxo alcohol ethoxylates, EO units: 3 to 30), LUTENSOL® AT grades ($C_{16}C_{18}$ fatty alcohol ethoxylates, EO units: 11 to 80), LUTENSOL® ON grades ($C_{10}$ oxo alcohol ethoxylates, EO units: 3 to 11), and the LUTENSOL® TO grades ($C_{13}$ oxo alcohol ethoxylates, EO units: 3 to 20) from BASF AG.

Customary anionic emulsifiers are, for example, alkali metal salts and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$).

Compounds which have proven suitable as further anionic emulsifiers are, furthermore, compounds of the general formula III

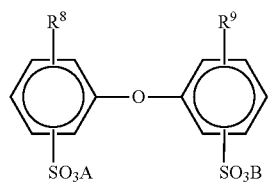

(III)

in which $R^8$ and $R^9$ are hydrogens or $C_4$ to $C_{24}$ alkyl but are not both simultaneously hydrogens and A and B can be alkali metal ions and/or ammonium ions. In the general formula III, $R^8$ and $R^9$ are preferably linear or branched alkyl radicals of 6 to 18 carbons, especially 6, 12 and 16 carbons, or —H, $R^8$ and $R^9$ not both being hydrogens simultaneously. A and B are preferably sodium, potassium or ammonium, particular preference being given to sodium. Particularly advantageous compounds III are those in which A and B are sodium, $R^8$ is a branched alkyl radical of 12 carbons, and $R^9$ is a hydrogen or $R^8$. Frequently, use is made of technical-grade mixtures containing a fraction of from 50 to 90% by weight of the monoalkylated product; for example, Dowfax® 2A1 (trademark of Dow Chemical Company). The compounds III are widely known, from U.S. Pat. No. 4,269,749, for example, and are obtainable commercially.

Suitable cation-active emulsifiers are generally $C_6$-$C_{18}$ alkyl, aralkyl or heterocyclyl-containing primary, secondary, tertiary or quaternary ammonium salts, alkanolammonium salts, pyridinium salts, imidazolinium salts, oxazolinium salts, morpholinium salts, thiazolinium salts, and salts of amine oxides, quinolinium salts, isoquinolinium salts, tropylium salts, sulfonium salts, and phosphonium salts. Examples that may be mentioned include dodecylammonium acetate or the corresponding hydrochloride, the chlorides or acetates of the various paraffinic acid 2-(N,N,N-trimethylammonium ethyl esters, N-cetylpyridinium chloride, N-laurylpyridinium sulfate, and also N-cetyl-N,N,N-trimethylammonium bromide, N-dodecyl-N,N,N-trimethylammonium bromide, N-octyl-N,N,N-trimethylammonium bromide, N,N-distearyl-N,N-dimethylammonium chloride, and the gemini surfactant N,N'-(lauryldimethyl)ethylenediamine dibromide. Many further examples can be found in H. Stache, Tensid-Taschenbuch, Carl-Hanser-Verlag, Munich, Vienna, 1981, and in McCutcheon's, Emulsifiers & Detergents, MC Publishing Company, Glen Rock, 1989. Frequently used for preparing the aqueous composite-particle dispersions is between 0.1% to 10%, often 0.5% to 7.0% and frequently 1.0% to 5.0% by weight of dispersant, based in each case on the total amount of aqueous composite-particle dispersion. Preference is given to using emulsifiers, especially nonionic and/or anionic emulsifiers. With particular advantage anionic emulsifiers are used.

In accordance with the invention it is possible if appropriate to include a portion or the entirety of dispersant in the initial charge in the polymerization vessel, as a constituent of the aqueous polymerization medium comprising a portion or the entirety of the inorganic solid [process step d)]. Alternatively it is possible to supply the entirety or any remainder of dispersant to the aqueous polymerization medium during step e) to g) of the process. The entirety or any remainder of dispersant can in that case be metered into the aqueous polymerization medium discontinuously, in one or more portions, or continuously, with the same or changing volume flow rates. With particular advantage the metering of at least a portion of the dispersants takes place during the polymerization reaction in step g) of the process, continuously with the same volume flow rates, more particularly as part of an aqueous monomer emulsion.

In accordance with the invention $\geq 0.01$ and $\leq 10$ parts, preferably $\geq 0.05$ and $\leq 5$ parts, and with particular preference $\geq 0.1$ and $\leq 2$ parts by weight of at least one silicon-containing compound (silane compound) are used per 100 parts by weight of monomers, the silane compound having at least one Si—OH group or at least one functional group which is hydrolyzed in deionized water at a temperature 100° C. to form an Si—OH or an Si—O—Si group, and the silane compound having no free-radically copolymerizable ethylenically unsaturated group.

More particularly, silane compounds having at least one $C_1$-$C_4$ alkoxy or halogen group are subject to complete hydrolysis in deionized water at temperatures $\leq 100°$ C. Highly suitable silane compounds are those which, for an amount of 1 g introduced in 100 g of deionized water, undergo complete hydrolysis within 1 hour at 90° C. The course of the hydrolysis may be monitored spectroscopically, as for example by means of IR spectroscopy, or gas chromatography.

As silane compound it is advantageous to make use of the compound of the general formula I

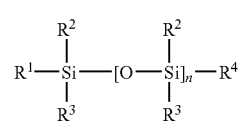

(I)

with $R^1$ to $R^4$ being OH, $C_1$-$C_4$ alkoxy, more particularly methoxy, ethoxy, n-propoxy or isopropoxy, n-butoxy, halogen, more particularly fluorine, chlorine, bromine, iodine, unsubstituted or substituted $C_1$-$C_{30}$ alkyl, more particularly unsubstituted alkyl, such as methyl, ethyl, n-propyl, isopropyl, n-butyl, isobutyl, tert-butyl, n-pentyl, n-octyl, n-decyl, hexadecyl or substituted alkyl, substituted for example by amino, acetoxy, benzoyl, halogen, cyano, glycidyloxy, hydroxy, isocyanato, mercapto, phenoxy, phosphato or isothiocyanato groups, unsubstituted or substituted (for corresponding substituents see $C_1$-$C_{30}$ alkyl) $C_5$-$C_{15}$ cycloalkyl, more particularly cyclopentyl or cyclohexyl, $C_1$-$C_4$ alkylene-[O—$CH_2CH_2$]$_x$—O—Z, with alkylene more particularly being ethylene or propylene, unsubstituted or substituted (for corresponding substituents see $C_1$-$C_{30}$ alkyl) $C_6$-$C_{10}$ aryl, more particularly phenyl, halophenyl or chlorosulfonylphenyl, unsubstituted or substituted (for corresponding substituents see $C_1$-$C_{30}$ alkyl) $C_7$-$C_{12}$ aralkyl, more particularly benzyl, Z being hydrogen, $C_1$-$C_4$ alkyl, such as methyl, ethyl, n-propyl, isopropyl, n-butyl, isobutyl, tert-butyl, preferably hydrogen or methyl, n being an integer from 0 to 5, preferably from 0 to 1, with particular preference 0, x being an integer from 1 to 10, preferably 1 to 5, and with particular preference 2 to 4, at least one of the radicals $R^1$ to $R^4$ being OH, $C_1$-$C_4$ alkoxy or halogen, or a compound of the general formula II

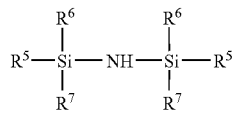

(II)

with $R^5$ to $R^7$ being unsubstituted or substituted $C_1$-$C_{30}$ alkyl, as described under $R^1$ to $R^4$, unsubstituted or substituted $C_5$-$C_{15}$ cycloalkyl, more particularly cyclopentyl or cyclohexyl, unsubstituted or substituted $C_6$-$C_{10}$ aryl, more particularly phenyl, unsubstituted or substituted $C_7$-$C_{12}$ aralkyl, more particularly benzyl.

As silane compounds it is possible with advantage in accordance with the invention to make use of 2-acetoxyethyltrichlorosilane, 2-acetoxyethyltriethoxysilane, 2-acetoxyethyltrimethoxysilane, acetoxymethyltriethoxysilane, acetoxymethyltrimethoxysilane, 3-acetoxypropyltrimethoxysilane, 3-acetoxypropylmethyldichlorosilane, 4-aminobutyltriethoxysilane, m-N-(2-aminoethyl)aminomethylphenethyltrimethoxysilane, p-N-(2-aminoethyl)-aminomethylphenethyltrimethoxysilane, N-(2-aminoethyl)-3-aminopropylmethyl-dimethoxysilane, N-(2-aminoethyl)-3-aminopropyltrihydroxysilane, N-(2-aminoethyl)-3-aminopropyltriethoxysilane, N-(2-aminoethyl)-3-aminopropyltrimethoxysilane, N-(6-aminohexyl)-3-aminopropyltriethoxysilane, N-(6-aminohexyl)-3-aminopropyl-trimethoxysilane,
3-aminopropyltrihydroxysilane, 3-aminopropyltriethoxysilane, 3-aminopropyltrimethoxysilane, 3-benzoyipropyltrimethoxysilane, benzyldimethyl-chlorosilane, benzyltrichlorosilane, benzyltriethoxysilane, benzyltrimethoxysilane, [1,3-bis(glycidyloxy)propyl]tetramethyldisiloxane, N,N-bis(2-hydroxyethyl)-3-amino-propyltriethoxysilane, o-bromophenyltrimethoxysilane, m-bromophenyltrimethoxysilane, p-bromophenyltrimethoxysilane, 3-bromopropyltrichlorosilane, 3-bromopropyl-trimethoxysilane, 11-bromoundecyltrimethoxysilane, 11-bromoundecyltrichlorosilane, tert-butyldiphenylmethoxysilane, tert-butyldiphenylchlorosilane, n-butyltrichlorosilane, tert-butyltrichlorosilane, n-butyltrimethoxysilane, tert-butyltrimethoxysilane, methyl 3-trichlorosilylpropionate, trihydroxysilylacetic acid sodium salt, 4-chlorobutyldimethylchlorosilane, 2-chloroethyldichloromethylsilane, 2-chloro-ethylmethyldimethoxysilane, 2-chloroethyltrichlorosilane, chloromethyldimethyl-chlorosilane, chloromethyldimethylethoxysilane, chloromethyldimethylisopropoxysilane, chloromethyldimethylchlorosilane, chloromethylmethyldiethoxysilane, chloromethyl-methyldiisopropoxysilane, p-chloromethylphenyltrichlorosilane, p-chloromethylphenyl-trimethoxysilane, chloromethyltrichlorosilane, chloromethyltriethoxysilane, chloromethyltrimethoxysilane, o-chlorophenyltrichlorosilane, m-chlorophenyltrichloro-silane, p-chlorophenyltrichlorosilane, o-chlorophenyltriethoxysilane, m-chlorophenyl-triethoxysilane, p-chlorophenyltriethoxysilane, 3-chloropropyldimethylchlorosilane, chloropropyldimethylmethoxysilane, 3-chloropropylmethyldichlorosilane, 3-chloropropylmethyldimethoxysilane, 3-chloropropyltrichlorosilane, 3-chloropropyltriethoxy-silane, 3-chloropropyltrimethoxysilane, 2-[4-chlorosulfonylphenyl]ethyltrichlorosilane, 2-[4-chlorosulfonylphenyl]ethyltrimethoxysilane, 3-cyanobutyldimethylchlorosilane, 3-cyanobutylmethyldichlorosilane, 3-cyanobutyltrichlorosilane, 2-cyanoethylmethyl-dichlorosilane, 2-cyanoethyltrichlorosilane, 2-cyanoethyltriethoxysilane, 2-cyanoethyltrimethoxysilane, 3-cyanopropyldimethylchlorosilane, 3-cyanopropylmethyl-dichlorosilane, 3-cyanopropylmethyldimethoxysilane, 3-cyanopropyltrichlorosilane, 3-cyanopropyltriethoxysilane, 3-cyanopropyltrimethoxysilane, 11-cyanoundecyl-trichlorosilane, 11-cyanoundecyltrimethoxysilane, cyclohexyldimethylchlorosilane, cyclohexylmethyldichlorosilane, cyclohexylmethyldimethoxysilane, (cyclohexylmethyl)trichlorosilane, cyclohexyltrichlorosilane, cyclohexyltrimethoxysilane, cyclopentyltrichlorosilane, cyclopentyltrimethoxysilane, n-decyldimethylchlorosilane, n-decylmethyldichlorosilane, n-decyltrichlorosilane, n-decyltriethoxysilane, di-n-butyldichlorosilane, di-n-butyldimethoxysilane, (dichloromethyl)methyldichlorosilane, 1,3-dichlorotetramethyldisiloxane, N,N-diethylaminomethyltriethoxysilane, diethyldichlorosilane, diethyldiethoxysilane, 2-(diethylphosphoryl)ethyltriethoxysilane, dimethyldihydroxysilane, di-n-hexyldichlorosilane, diisopropyldichlorosilane, diisopropyldimethoxysilane, 3-N,N-dimethylaminopropyltrimethoxysilane, dimethyldichlorosilane, dimethyldiethoxysiiane, dimethyldimethoxysilane, 1,3-dimethyltetramethoxydisiloxane, 3-(2,4-dinitrophenylamino)propyltriethoxysilane, di-n-octyldichlorosilane, diphenyldichlorosilane, diphenyldiethoxysilane, diphenyldimethoxysilane, diphenyldifluorosilane, diphenylmethylchlorosiiane, diphenylmethylethoxysilane, diphenyldihydroxysilane, docosylmethyldichlorosilane, docosyltrichlorosilane, dodecyldimethylchlorosilane, dodecylmethyldichlorosilane, dodecylmethyldiethoxysilane, dodecyltrichlorosiiane, dodecyltriethoxysilane, 3-N-ethylaminoisobutylmethyldiethoxysilane, 3-N-ethylaminoisobutyltrimethoxysilane, ethyldimethylchlorosilane, ethylmethyldichlorosilane, m-ethylphenethyltrimethoxysilane, ethyltriacetoxysilane, ethyltrichlorosilane, ethyltriethoxysilane, ethyltrimethoxysilane, 3-glycidyloxypropyldimethylethoxysilane, 3-glycidyloxypropylmethyldiethoxysilane, 3-glycidyloxypropylmethyldimethoxysilane, 3-glycidyloxypropyltriethoxysilane, 3-glycidyloxypropyltrimethoxysilane, n-heptylmethyldichlorosilane, n-heptyl-trichlorosilane, n-hexadecyltrichlorosilane, n-hexadecyltriethoxysilane, n-hexadecyl-trimethoxysilane, n-hexylmethyldichlorosilane, n-hexyltrichlorosilane, n-hexyl-triethoxysilane, hydroxymethyltriethoxysilane, 3-iodopropyltrimethoxysilane, isobutyldimethylchlorosilane, isobutylmethyldimethoxysilane, isobutyltrichlorosilane, isobutyltriethoxysilane, isobutyltrimethoxysilane, 3-isocyanatopropyldimethyl-chlorosilane, 3-isocyanatopropyltriethoxysilane, 3-isocyanatopropyltrimethoxysilane, isooctyltrichlorosilane, isooctyltrimethoxysilane, isopropyldimethylchlorosilane, isopropylmethyldichlorosilane, 3-mercaptopropylmethyldimethoxysilane, 3-mercapto-propyltriethoxysilane, 3-mercaptopropyltrimethoxysilane, 3-(p-methoxyphenyl)propyl-methyldichlorosilane, 3-(p-methoxyphenyl)propyltrichlorosilane, 2-[methoxy(polyethyleneoxy)]propyltrimethoxysilane, 3-methoxypropyltrimethoxysilane, 3-(N-methylamino)propylmethyldimethoxysilane, 3-(N-methylamino)propyl-trimethoxysilane, methyltribromosilane, methyltrichlorosilane, methyltriethoxysilane, methyltrimethoxysilane, methyltrifluorosilane, methyltri-n-propoxysilane, tris(methoxyethoxy)methylsilane, n-octadecyldimethylchlorosilane, n-octadecyl-dimethylmethoxysilane, n-octadecyldimethyl(3-trimethoxysilylpropyl)ammonium chloride, n-octadecylmethoxydichlorosilane, n-octadecylmethyldichlorosilane, n-octadecylmethyldiethoxysilane, n-octadecylmethyldimethoxysilane, n-octadecyl-trichlorosilane, n-octadecyltriethoxysilane, n-octadecyltrimethoxysilane, S-(octanoyl)-mercaptopropyltriethoxysilane, n-octyldimethylchlorosilane, n-octyldimethylmethoxy-silane, n-octyltrichlorosilane, n-octyltriethoxysilane, n-octyltrimethoxysilane, n-pentyltrichlorosilane, n-pentyltriethoxysilane, 2-phenylethyltrichlorosilane, 2-phenylethyltrimethoxysilane, 3-phenoxypropyltrichlorosilane, 3-(N-phenylamino)-propyltriethoxysilane, 3-(N-phenylamino)propyltrimethoxysilane, phenylmethyl-dichlorosilane, phenylmethyldiethoxysilane, phenylmethyldimethoxysilane, phenyltrichlorosilane, phenyltriethoxysilane, phenyltrifluorosilane, phenyltrimethoxysilane, n-propyldimethylchlorosilane, n-propylmethyldichlorosilane, n-propyltrichloro-silane, n-propyltriethoxysilane, n-propyltrimethoxysilane, 1,3-diethoxy-1,1,3,3-tetra-methyldisiloxane, tetra-n-propoxysilane, 3-thiocyanatopropyltriethoxysilane, p-tolyltrichlorosilane, p-tolyltrimethoxysilane, triacontyldimethylchlorosilane, triacontyltrichlorosilane, tri-tert-butoxyhydroxysilane, 3-(2-sulfolanyloxyethoxy)-propyltriethoxysilane, 3-(tert-butyloxycarbonylamino)propyl-triethoxysilane, 3-(ethyloxycarbonylamino)propyltriethoxysilane, 3-[(2-hydroxypolyethyleneoxy)-carbonylamino]propyltriethoxysilane, 3-(triethoxysilylpropyl)dihydro-3,5-furandione, (3,3,3-trifluoropropyl)trimethoxysilane, 3-(hydroxysulfonyl)propyltrihydroxysilane, 3-(methylphosphonyl)propyltrihydroxysilane, triisopropylsilane, N-[(5-trimethoxysilyl)-2-aza-1-oxypentyl]caprolactam, (3-trimethoxysilylpropyl)diethylenetriaminetriacetic acid trisodium salt, N-trimethoxysilylpropyl-N,N,N-trimethylammonium chloride, trimethyl-chlorosilane, trimethylbromosilane, trimethylethoxysilane, trimethylfluorosilane, trimethyliodosilane, trimethylmethoxysilane, trimethyl-n-propoxysilane, triphenyl-chlorosilane, triphenylethoxysilane, triphenylhydroxysilane, 3-ureidopropyltriethoxy-silane, 3-ureidopropyltrimethoxysilane, 1,1,1,3,3,3-hexamethyldisilazane, 1,3-di-n-butyl-1,1,3,3-tetramethyldisilazane. It will be appreciated that it is also possible in accordance with the invention to use mixtures of silane compounds.

As silane compound it is particularly preferred to make use of methyltrimethoxysilane, n-propyltrimethoxysilane, n-octyltrimethoxysilane, n-decyltriethoxysilane, n-hexadecyltrimethoxysilane, dimethyldimethoxysilane, trimethylmethoxysilane, 3-acetoxypropyltrimethoxysilane, 3-aminopropyltrimethoxysilane, 3-chloropropyl-trimethoxysilane, 3-glycidyloxypropyltrimethoxysilane, 3-mercaptopropyltrimethoxy-silane, phenyltrimethoxysilane and/or 1,1,1,3,3,3-hexamethyldisilazane.

In step e) of the process at least a portion of the silane compounds is metered into the aqueous polymerization medium over a period $\geq 5$ and $\leq 240$ minutes, advantageously $\geq 30$ and $\leq 120$ minutes, and with particular advantage 45 and 90 minutes. This metering takes place advantageously with the same continuous volume flow. In step e) of the process, in accordance with the invention $\geq 0.1\%$ and $\leq 100\%$ by weight, advantageously $\geq 5\%$ and $\leq 70\%$ by weight, and with particular advantage 10% and $\leq 50\%$ by weight of silane compounds, based on the total amount of the silane compounds, are metered into the aqueous polymerization medium.

The silane compound may be used in this case as it is or dissolved in aqueous or organic medium. With advantage, the silane compound is used as it is, i.e., without any further solvent.

Generally speaking, step e) of the process takes place with the aqueous polymerization medium at a temperature $\geq 20°$ C., with advantage at a temperature $\geq 50$ and $\leq 100°$ C., and with particular advantage at a temperature $\geq 60$ and $\leq 100°$ C. and with more particular advantage $\geq 75$ and $\leq 95°$ C.

Any remainder of silane compounds can be metered into the aqueous polymerization medium in step g) of the process, discontinuously in one or more portions, or continuously with the same or changing volume flow rates. With particular advantage the metering of the silane compounds takes place during the polymerization reaction in step g) of the process, continuously with the same volume flow rates, more particularly as part of an aqueous monomer emulsion.

According to the invention, suitable ethylenically unsaturated monomers include all those which are easy to polymerize free-radically in aqueous medium and which are familiar to the skilled worker from aqueous emulsion polymerization. These include, inter alia, ethylene, vinylaromatic monomers, such as styrene, α-methylstyrene, o-chlorostyrene or vinyltoluenes, esters of vinyl alcohol and $C_1$-$C_{18}$ monocarboxylic acids, such as vinyl acetate, vinyl propionate, vinyl n-butyrate, vinyl laurate and vinyl stearate, esters of preferably $C_3$-$C_6$ α,β-monoethylenically unsaturated mono- and dicarboxylic acids, such as especially acrylic acid, methacrylic acid, maleic acid, fumaric acid and itaconic acid, with generally $C_1$-$C_{12}$, preferably $C_1$-$C_8$ and, in particular, $C_1$-$C_4$ alkanols, such as, in particular, methyl, ethyl, n-butyl, isobutyl and 2-ethylhexyl acrylate and methacrylate, dimethyl maleate and di-n-butyl maleate, nitriles of α,β-monoethylenically unsaturated carboxylic acids, such as acrylonitrile, and $C_{4-8}$ conjugated dienes, such as 1,3-butadiene and isoprene. These monomers generally constitute the principal monomers, which, based on the total monomer amount, normally account for a proportion of $\geq 50\%$, $\geq 80\%$ or $\geq 90\%$ by weight. As a general rule, these monomers are only of moderate to poor solubility in water under standard conditions [20° C., 1 atm (absolute)].

Further monomers which customarily increase the internal strength of the films of the polymer matrix normally contain at least one hydroxyl, N-methylol or carbonyl group or at least two nonconjugated ethylenically unsaturated double bonds. Examples here are monomers having two vinyl radicals, monomers having two vinylidene radicals, and monomers having two alkenyl radicals. Particularly advantageous in this context are the diesters of dihydric alcohols with β,β-monoethylenically unsaturated monocarboxylic acids, among which acrylic and methacrylic acid are preferred. Examples of this kind of monomer having two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Of particular importance in this context are also the methacrylic and acrylic $C_1$-$C_8$ hydroxyalkyl esters, such as n-hydroxyethyl, n-hydroxypropyl or n-hydroxybutyl acrylate and methacrylate, and compounds such as diacetoneacrylamide and acetylacetoxyethyl acrylate and methacrylate. In accordance with the invention, the aforementioned monomers are used in amounts of up to 5%, frequently 0.1% to 3%, and often 0.5% to 2% by weight, based in each case on the total monomer amount, for the polymerization.

Besides these, it is possible additionally to use as monomers those ethylenically unsaturated monomers S which either comprise at least one acid group and/or its corresponding anion or those ethylenically unsaturated monomers A which comprise at least one amino, amido, ureido or N-heterocyclic group and/or the N-protonated or N-alkylated ammonium derivatives thereof. Based on the total monomer amount, the amount of monomers S or monomers A, respectively, is up to 10% by weight, often 0.1% to 7% by weight, and frequently 0.2% to 5% by weight.

Monomers S used are ethylenically unsaturated monomers containing at least one acid group. The acid group may, for example, be a carboxylic, sulfonic, sulfuric, phosphoric and/or phosphonic acid group. Examples of such monomers S are acrylic acid, methacrylic acid, maleic acid, fumaric acid, itaconic acid, crotonic acid, 4-styrene-sulfonic acid, 2-methacryloyloxyethylsulfonic acid, vinylsulfonic acid, and vinylphosphonic acid, and also phosphoric monoesters of n-hydroxyalkylacrylates and n-hydroxyalkyl methacrylates, such as phosphoric monoesters of hydroxyethyl acrylate, n-hydroxypropyl acrylate, n-hydroxybutyl acrylate and hydroxyethyl methacrylate, n-hydroxypropyl methacrylate or n-hydroxybutyl methacrylate, for example. In accordance with the invention, however, it is also possible to use the ammonium and alkali metal salts of the aforementioned ethylenically unsaturated monomers containing at least one acid group. Particularly preferred alkali metals are sodium and potassium. Examples of such compounds are the ammonium, sodium, and potassium salts of acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid, and also the mono- and di-ammonium, -sodium and -potassium salts of the phosphoric monoesters of hydroxyethyl acrylate, n-hydroxypropyl acrylate, n-hydroxybutyl acrylate and hydroxyethyl methacrylate, n-hydroxypropyl methacrylate or n-hydroxybutyl methacrylate.

Preference is given to using acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid as monomers S.

As monomers A, use is made of ethylenically unsaturated monomers which comprise at least one amino, amido, ureido or N-heterocyclic group and/or the N-protonated or N-alkylated ammonium derivatives thereof.

Examples of monomers A which comprise at least one amino group are 2-aminoethyl acrylate, 2-aminoethyl methacrylate, 3-aminopropyl acrylate, 3-aminopropyl methacrylate, 4-amino-n-butyl acrylate, 4-amino-n-butyl methacrylate, 2-(N-methylamino)ethyl acrylate, 2-(N-methylamino)ethyl methacrylate, 2-(N-ethylamino)ethyl acrylate, 2-(N-ethylamino)ethyl methacrylate, 2-(N-n-propylamino)ethyl acrylate, 2-(N-n-propylamino)ethyl methacrylate, 2-(N-iso-propylamino)ethyl acrylate, 2-(N-iso-propylamino)ethyl methacrylate, 2-(N-tert-butylamino)ethyl acrylate, 2-(N-tert-butylamino)ethyl methacrylate (available commercially, for example, as Norsocryl® TBAEMA from Elf Atochem), 2-(N,N-dimethylamino)ethyl acrylate (available commercially, for example, as Norsocryl® ADAME from Elf Atochem), 2-(N,N-dimethylamino)ethyl methacrylate (available commercially, for example, as Norsocryl® MADAME from Elf Atochem), 2-(N,N-diethylamino)ethyl acrylate, 2-(N,N-diethylamino)ethyl methacrylate, 2-(N,N-di-n-propylamino)ethyl acrylate, 2-(N,N-di-n-propylamino)ethyl methacrylate, 2-(N,N-di-iso-propylamino)ethyl acrylate, 2-(N,N-di-iso-propylamino)ethyl methacrylate, 3-(N-methylamino)propyl acrylate, 3-(N-methylamino)propyl methacrylate, 3-(N-ethylamino)propyl acrylate, 3-(N-ethylamino)propyl methacrylate, 3-(N-n-propylamino)propyl acrylate, 3-(N-n-propylamino)propyl methacrylate, 3-(N-iso-propylamino)propyl acrylate, 3-(N-iso-propylamino)propyl methacrylate, 3-(N-tert-butylamino)propyl acrylate, 3-(N-tert-butylamino)propyl methacrylate, 3-(N,N-dimethylamino)propyl acrylate, 3-(N,N-dimethylamino)propyl methacrylate, 3-(N,N-diethylamino)propyl acrylate, 3-(N,N-diethylamino)propyl methacrylate, 3-(N,N-di-n-propylamino)propyl acrylate, 3-(N,N-di-n-propylamino)propyl methacrylate, 3-(N,N-di-iso-propylamino)propyl acrylate, and 3-(N,N-di-iso-propylamino)propyl methacrylate.

Examples of monomers A which comprise at least one amido group are acrylamide, methacrylamide, N-methylacrylamide, N-methylmethacrylamide, N-ethylacrylamide, N-ethylmethacrylamide, N-n-propylacrylamide, N-n-propylmethacrylamide, N-iso-propylacrylamide, N-iso-propylmethacrylamide, N-tert-butylacrylamide, N-tert-butylmethacrylamide, N,N-dimethylacrylamide, N,N-dimethylmethacrylamide, N,N-diethylacrylamide, N,N-diethylmethacrylamide, N,N-di-n-propylacrylamide, N,N-di-n-propylmethacrylamide, N,N-di-iso-propylacrylamide, N,N-di-iso-propylmethacrylamide, N,N-di-n-butylacrylamide, N,N-di-n-butylmethacrylamide, N-(3-N',N'-dimethylaminopropyl)methacrylamide, diacetoneacrylamide, N,N'-methylenebisacrylamide, N-(diphenylmethyl)acrylamide, N-cyclohexylacrylamide, and also N-vinylpyrrolidone and N-vinylcaprolactam.

Examples of monomers A which comprise at least one ureido group are N,N'-divinylethyleneurea and 2-(1-imidazolin-2-onyl)ethyl methacrylate (available commercially, for example, as NORSOCRYL® 100 from Elf Atochem).

Examples of monomers A which comprise at least one N-heterocyclic group are 2-vinylpyridine, 4-vinylpyridine, 1-vinylimidazole, 2-vinylimidazole, and N-vinylcarbazole.

Preference is given to using as monomers A the following compounds: 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide, and 2-(1-imidazolin-2-onyl)ethyl methacrylate.

Depending on the pH of the aqueous reaction medium, it is possible for some or all of the aforementioned nitrogen-containing monomers A to be present in the N-protonated quaternary ammonium form.

Examples that may be mentioned as monomers A which have a quaternary alkylammonium structure on the nitrogen include 2-(N,N,N-trimethylammonium)ethyl acrylate chloride (available commercially, for example, as Norsocryl® ADAMQUAT MC 80 from Elf Atochem), 2-(N,N,N-trimethylammonium)ethyl methacrylate chloride (available commercially, for example, as NORSOCRYL® MADQUAT MC 75 from Elf Atochem), 2-(N-methyl-N,N-diethylammonium) ethyl acrylate chloride, 2-(N-methyl-N,N-diethylammonium)ethyl methacrylate chloride, 2-(N-methyl-N,N-dipropylammonium)ethyl acrylate chloride, 2-(N-methyl-N,N-dipropylammonium)ethyl methacrylate, 2-(N-benzyl-N,N-dimethylammonium)ethyl acrylate chloride (available commercially, for example, as NORSOCRYL® ADAMQUAT BZ 80 from Elf Atochem), 2-(N-benzyl-N,N-dimethylammonium)ethyl methacrylate chloride (available commercially, for example, as NORSOCRYL® MADQUAT BZ 75 from Elf Atochem), 2-(N-benzyl-N,N-diethylammonium) ethyl acrylate chloride, 2-(N-benzyl-N,N-diethylammonium)ethyl methacrylate chloride, 2-(N-benzyl-N,N-dipropylammonium)ethyl acrylate chloride, 2-(N-benzyl-N,N-dipropylammonium)ethyl methacrylate chloride, 3-(N,N,N-trimethylammonium)propyl acrylate chloride, 3-(N,N,N-trimethylammonium)propyl methacrylate chloride, 3-(N-methyl-N,N-diethylammonium)propyl acrylate chloride, 3-(N-methyl-N,N-diethylammonium)propyl methacrylate chloride, 3-(N-methyl-N,N-dipropylammonium)propyl acrylate chloride, 3-(N-methyl-N,N-dipropylammonium) propyl methacrylate chloride, 3-(N-benzyl-N,N-dimethylammonium)propyl acrylate chloride, 3-(N-benzyl-N,N-dimethylammonium)propyl methacrylate chloride, 3-(N-benzyl-N,N-diethylammonium)propyl acrylate chloride, 3-(N-benzyl-N,N-diethylammonium)propyl methacrylate chloride, 3-(N-benzyl-N,N-dipropylammonium)propyl acrylate chloride, and 3-(N-benzyl-N,N-dipropylammonium) propyl methacrylate chloride. It is of course also possible to use the corresponding bromides and sulfates instead of the chlorides named.

Preference is given to using 2-(N,N,N-trimethylammonium)ethyl acrylate chloride, 2-(N,N,N-trimethylammonium)ethyl methacrylate chloride, 2-(N-benzyl-N,N-dimethylammonium)ethyl acrylate chloride, and 2-(N-benzyl-N, N-dimethylammonium)ethyl methacrylate chloride.

It is of course also possible to use mixtures of the aforementioned ethylenically unsaturated monomers S and/or B.

It may frequently be advantageous to additionally add monomers which contain at least one silicon functional group (silane monomers), such as, for example, vinylalkoxysilanes, such as more particularly vinyltrimethoxysilane, vinyltriethoxysilane, vinyltriisopropoxysilane, vinyltriphenoxysilane, vinyltris(dimethylsiloxy)silane, vinyltris(2-methoxyethoxy)silane, vinyltris(3-methoxypropoxy)silane and/or vinyltris(trimethylsiloxy)silane, acryloyloxysilanes, such as more particularly 2-(acryloyloxyethoxy)trimethylsilane, acryloyloxymethyltrimethylsilane, (3-acryloyloxy-propyl) dimethylmethoxysilane, (3-acryloyloxypropyl)methylbis (trimethylsiloxy)silane, (3-acryloyloxypropyl)methyldimethoxysilane, (3-acryloyloxypropyl)trimethoxysilane and/or (3-acryloyloxypropyl)tris(trimethylsiloxy)silane, methacryloyloxysilanes, such as more particularly (3-methacryloyloxypropyl)trimethoxysilane, (3-methacryloyloxypropyl)triethoxysilane, (methacryloyloxymethyl)methyldiethoxysilane and/or (3-methacryloyloxypropyl) methyldiethyloxysilane. With particular advantage in accordance with the invention use is made of acryloyloxysilanes and/or methacryloyloxysilanes, more particularly methacryloyloxysilanes, such as preferably (3-methacryloyloxypropyl)trimethoxysilane, (3-methacryloyloxypropyl)triethoxysilane, (methacryloyloxymethyl)methyldiethoxysilane and/or (3-methacryloyloxypropyl)-methyldiethyloxysilane. The amount of silane monomers is $\leq 10\%$ by weight, advantageously $\geq 0.01$ and $\leq 5\%$ by weight and with particular advantage $\geq 0.1$ and $\leq 2\%$ by weight, based in each case on the total monomer amount.

All abovementioned ethylenically unsaturated monomers may be metered in this case as separate individual streams, or as a mixture discontinuously in one or more portions, or continuously with the same or changing volume flow rates in steps f) and g) of the process. With advantage, the addition of the ethylenically unsaturated monomers takes place as a mixture, and with particular advantage in the form of an aqueous monomer emulsion.

With particular advantage the composition of the ethylenically unsaturated monomers is chosen such that polymerization of them alone would result in an addition polymer having a glass transition temperature $\leq 100°$ C., preferably $\leq 60°$ C., in particular $\leq 40°$ C., and frequently $\geq -30°$ C. and often $\geq -20°$ C. or $\geq -10°$ C.

The glass transition temperature is normally determined in accordance with DIN 53 765 (Differential Scanning Calorimetry, 20 K/min, midpoint measurement).

According to Fox (T. G. Fox, Bull. Am. Phys. Soc. 1956 [Ser. II] 1, page 123, and in accordance with Ullmann's Encyclopädie der technischen Chemie, Vol. 19, page 18, 4th edition, Verlag Chemie, Weinheim, 1980) it is the case that for the glass transition temperature $T_g$ of copolymers with no more than low degrees of crosslinking, in good approximation:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, T_g^n$ are the glass transition temperatures of the addition polymers synthesized in each case only from one of the monomers 1, 2, ... n, in degrees Kelvin. The $T_g$ values for the homopolymers of the majority of monomers are known and are listed for example in Ullmann's Encyclopedia of Industrial Chemistry, 5th ed., Vol. A21, page 169, Verlag Chemie, Weinheim, 1992; further sources of homopolymer glass transition temperatures are formed, for example, by J. Brandrup, E. H. Immergut, Polymer Handbook, $1^{st}$ Ed., J. Wiley, New York, 1966; $2^{nd}$ Ed. J. Wiley, New York, 1975 and $3^{rd}$ Ed. J. Wiley, New York, 1989.

In accordance with the invention, following step e) of the process, if appropriate $\leq 20\%$ by weight, advantageously $\geq 1\%$ and $\leq 15\%$ by weight and with particular advantage $\geq 2\%$ and $\leq 10\%$ by weight of the monomers are added to the aqueous polymerization medium and free-radically polymerized.

Initiators suitable for initiating the free-radical polymerization include all those free-radical polymerization initiators (radical initiators) capable of triggering a free-radical aqueous emulsion polymerization. The initiators can in principle comprise both peroxides and azo compounds. Redox initiator systems are also suitable, of course. Peroxides used can in principle be inorganic peroxides, such as hydrogen peroxide or peroxodisulfates, such as the mono- or di-alkali metal salts or ammonium salts of peroxodisulfuric acid, examples being the mono- and di-sodium and -potassium salts, or ammonium salts, thereof, or else organic peroxides, such as alkyl hydroperoxides, examples being tert-butyl, p-mentyl and cumyl hydroperoxide, and also dialkyl or diaryl peroxides, such as di-tert-butyl peroxide or dicumyl peroxide. Azo compounds used are primarily 2,2'-azobis(isobutyronitrile), 2,2'-azobis (2,4-dimethylvaleronitrile), and 2,2'-azobis(amidinopropyl)

dihydrochloride (AIBA, corresponding to V-50 from Wako Chemicals). Suitable oxidizing agents for redox initiator systems are essentially the abovementioned peroxides. Corresponding reducing agents used can be compounds of sulfur with a low oxidation state, such as alkali metal sulfites, e.g., potassium and/or sodium sulfite, alkali metal hydrogen sulfites, e.g., potassium and/or sodium hydrogen sulfite, alkali metal metabisulfites, e.g., potassium and/or sodium metabisulfite, formaldehyde-sulfoxylates, e.g., potassium and/or sodium formaldehyde-sulfoxylate, alkali metal salts, especially potassium salts and/or sodium salts, of aliphatic sulfinic acids, and alkali metal hydrogen sulfides, e.g., potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone. In general, the amount of the free-radical initiator used in total, based on the total monomer amount, is 0.1% to 5% by weight, advantageously 0.5 to 2% by weight.

By initiation of the polymerization reaction is meant the start of the polymerization reaction of the monomers present in the aqueous polymerization medium after the formation of free radicals by the free-radical initiator. The initiation of the polymerization reaction can take place by addition of free-radical initiator to the aqueous polymerization medium under polymerization conditions [process step g)]. An alternative possibility is to add a portion or the entirety of the free-radical initiator to the aqueous polymerization medium comprising the monomers included in the initial charge, under conditions which are not suitable to initiate a polymerization reaction, at low temperature, for example [process steps e) and f)] and thereafter to set polymerization conditions in the aqueous polymerization mixture. By polymerization conditions here are meant, generally, those temperatures and pressures under which the free-radically initiated aqueous emulsion polymerization proceeds with a sufficient polymerization rate. They are dependent more particularly on the free-radical initiator that is used. Advantageously the nature and amount of the free-radical initiator, the polymerization temperature, and the polymerization pressure are selected such that the free-radical initiator has a half-life $\leq 3$ hours, with particular advantage 1 hour, and especially advantageously $\leq 30$ minutes, while at the same time always providing starting free radicals sufficient to initiate and maintain the polymerization reaction.

Suitable reaction temperatures for the free-radical aqueous emulsion polymerization reaction in the presence of the finely divided inorganic solid embrace the entire range from 0 to 170° C. In general, the temperatures used are from 50 to 120° C., frequently 60 to 110° C. and often 70 to 100° C. The free-radical aqueous emulsion polymerization can be conducted at a pressure less than, equal to or greater than 1 atm (atmospheric pressure), and the polymerization temperature may exceed 100° C. and can be up to 170° C. Polymerization is preferably carried out in the presence of highly volatile monomers B, such as ethylene, butadiene or vinyl chloride, under increased pressure. In this case the pressure can adopt values of 1.2, 1.5, 2, 5, 10 or 15 bar or even higher. When emulsion polymerizations are conducted under subatmospheric pressure, pressures of 950 mbar, frequently 900 mbar and often 850 mbar (absolute) are established. The free-radical aqueous emulsion polymerization is advantageously conducted at 1 atm (absolute) in the absence of oxygen, more particularly under an inert gas atmosphere, such as under nitrogen or argon, for example.

In this case the free-radical initiator may in principle be metered in discontinuously or in one or more portions or continuously with the same or changing volume flow rates. The addition of the free-radical initiator per se is not critical and is familiar to the skilled worker or may be adapted by the latter to the appropriate polymerization system in a few routine preliminary experiments.

Where monomers are introduced in the initial charge in step f) of the process, they are polymerized by addition of at least a portion of the free-radical initiator and adjustment of polymerization conditions at least up to a conversion $\geq 70\%$, preferably $\geq 80\%$, and more particularly $\geq 90\%$ by weight.

Subsequently any remainder of the inorganic solid, any remainder of the silane compound, any remainder or the entirety of the monomers are metered into the aqueous polymerization medium under polymerization conditions, discontinuously in one or more portions or, with advantage, continuously with constant or changing volume flow rates, and, with particular advantage, with constant volume flow rates. With advantage the addition of at least one portion of the free-radical initiator takes place continuously at a constant volume flow rate. In this case the polymerization conditions are advantageously chosen such that the monomers used are polymerized up to a conversion $\geq 90\%$, preferably $\geq 95\%$, and more particularly $\geq 98\%$ by weight.

It is important for the process of the invention that in principle readily water-soluble organic solvents, such as methanol, ethanol, isopropanol, butanols, but also acetone, etc., for example, may also be added to the aqueous polymerization medium to a minor extent. It is important, however, that the amount of organic solvent added is such that at the end of step e) of the process it is $\geq 10\%$, advantageously $\geq 5\%$, and with particular advantage $\geq 2\%$ by weight, based in each case on the total amount of water in the aqueous composite-particle dispersion obtainable in accordance with the invention. In accordance with the invention, advantageously, no such solvents at all are present.

Besides the abovementioned components it is also possible, optionally, in the process of the invention for preparing the aqueous composite-particle dispersion, to use free-radical chain transfer compounds in order to reduce or control the molecular weight of the addition polymers obtainable by the polymerization. Suitable compounds of this type include, essentially, aliphatic and/or araliphatic halogen compounds, such as n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecanethiol and its isomers, substituted thiols, such as 2-hydroxyethanethiol, aromatic thiols, such as benzenethiol, ortho-, meta-, or para-methylbenzenethiol, and also all other sulfur compounds described in Polymer Handbook $3^{rd}$ edition, 1989, J. Brandrup and E. H. Immergut, John Wiley & Sons, Section II, pages 133 to 141, and also aliphatic and/or aromatic aldehydes, such as acetaldehyde, propionaldehyde and/or benzaldehyde, unsaturated fatty acids, such as oleic acid, dienes with nonconjugated double bonds, such as divinylmethane, or vinylcyclohexane or hydrocarbons having readily abstractable hydrogen atoms, such as toluene, for example. It is, however, also possible to use mixtures of mutually compatible, abovementioned free-radical chain transfer compounds. The total amount of the free-radical chain transfer compounds used optionally, based on the total monomer amount, is generally ≦5% by weight, often ≦3% by weight, and frequently ≦1% by weight.

Depending on the stability of the aqueous dispersions of solids that are used, steps e) to g) of the process may be carried out in the acidic, neutral or basic pH range. When phyllosilicates are used, the pH is advantageously ≧5 and ≦11, with particular advantage ≧6 and ≦10 (respective sample measured at 20° C. and 1 atm). Adjustment of the pH ranges is familiar to the skilled worker and takes place in particular with nonoxidizing inorganic acids, such as hydrochloric, sulfuric or phosphoric acid or inorganic bases, such as ammonia, sodium hydroxide or potassium hydroxide.

Of course, the aqueous composite-particle dispersions obtainable by the process of the invention may also comprise further optional auxiliaries familiar to the skilled worker, such as what are known as thickeners, antifoams, buffer substances, preservatives etc. in customary amounts.

The aqueous composite-particle dispersions obtainable by the process of the invention normally have a total solids content of ≧1% and ≦70%, frequently ≧5% and ≦65%, and often ≧10% to ≦60%, by weight.

The composite particles obtainable by the invention generally have particle diameters of >10 nm and ≦1000 nm, frequently ≧25 nm and ≦500 nm, and often ≧50 nm and ≦250 nm. The determination of the particle size of the composite particles takes place, in the context of this specification, generally by the method of quasielastic light scattering (DIN ISO 13321) using a High Performance Particle Sizer (HPPS) from Malvern Instruments Ltd.

The composite particles obtainable by the process of the invention can have different structures. These composite particles may comprise one or more of the finely divided inorganic solid particles. The finely divided inorganic solid particles may be completely enveloped by the polymer matrix. It is, however, also possible for some of the finely divided inorganic solid particles to be enveloped by the polymer matrix, while some others are disposed on the surface of the polymer matrix. As will be appreciated, it is also possible for a major fraction of the finely divided inorganic solid particles to be bound on the surface of the polymer matrix.

The remaining amounts of unreacted monomers or other readily volatile compounds that are left in the aqueous polymerization medium after the conclusion of the polymerization reaction can be removed by means of steam stripping and/or inert-gas stripping, or by means of chemical deodorization, as described, for example, in specifications DE-A 4419518, EP-A 767180 or DE-A 3834734, without disadvantageously changing the properties of the aqueous composite-particle dispersions.

Addition-polymer films comprising inorganic solid particles can be produced in a simple way from the aqueous composite-particle dispersions obtainable by way of the process of the invention. As compared with addition-polymer films not comprising inorganic solid particles, these additional-polymer films generally feature enhanced mechanical strength, reduced whitening, improved adhesion to mineral surfaces, improved resistance to organic solvents, and enhanced scratch resistance, blocking resistance, and heat stability.

Aqueous composite-particle dispersions prepared in accordance with the process of the invention are thus particularly suitable, for example, as a binder, for producing a protective coat, as a component in adhesives or for modifying cement formulations and mortar formulations, or in medical diagnostics (cf., e.g., K. Mosbach and L. Andersson, Nature 270 (1977), pages 259 to 261; P. L. Kronick, Science 200 (1978), pages 1074 to 1076; and U.S. Pat. No. 4,157,323). Furthermore, the composite particles can also be used as catalysts in various aqueous dispersion systems.

It is also noted that the aqueous composite-particle dispersions obtainable in accordance with the invention can be dried in a simple way to form redispersible composite-particle powders (e.g., by means of freeze drying or spray drying). This is particularly the case when the glass transition temperature of the polymer matrix of the composite particles obtainable in accordance with the invention is ≧50° C., preferably ≧60° C., more preferably ≧70° C., very preferably ≧80° C., and with particular preference ≧90° C. or ≧100° C. The composite-particle powders are suitable, among other things, as additives for plastics, as components for toner formulations or as additives in electrophotographic applications, and also as components in cement formulations and mortar formulations.

The process of the invention permits single-stage and solvent-free access to aqueous composite-particle dispersions, using silane compounds which cannot be copolymerized free-radically. Furthermore, the films obtainable from the aqueous composite-particle dispersions of the invention feature improved breaking strengths and/or breaking extensions. The films also exhibit a relatively homogeneous distribution of the inorganic solid.

The invention is illustrated in more detail with reference to the following, nonlimiting examples.

EXAMPLES a) Preparation of the Aqueous Composite-Particle Dispersions

Example 1

A 2 l four-necked flask equipped with a reflux condenser, a thermometer, a mechanical stirrer, and a metering device was charged at 20 to 25° C. (room temperature) and 1 atm (absolute), under a nitrogen atmosphere and with stirring (200 revolutions per minute), with 489 g of deionized water, 20 g of LAPONITE® RDS phyllosilicate in powder form (trademark of Rockwood Holdings, Inc.; average diameter in the delaminated, dispersed state: 20 to 50 nm) over the course of 5 minutes. In order to delaminate the phyllosilicate completely, the initial charge was stirred further for 15 minutes (200 revolutions per minute) and then heated to 82° C. Subsequently 1.1 g of n-octyltrimethoxysilane were metered in continuously over the course of one hour via a feed line. Then a solution consisting of 40 g of deionized water, 2.1 g of a 10% strength by weight aqueous sodium hydroxide solution and 0.6 g of sodium peroxodisulfate was added over the course of 2 minutes via a further, separate feed line, and 5 minutes were allowed to pass. Subsequently the reaction mixture was heated to 85° C. In parallel with this a homogenous emulsion was prepared, as feed 1, consisting of 401 g of deionized water, 8.9 g of a 45% strength by weight aqueous solution of Dowfax® 2A1, 18.4 g of a 10% strength by weight aqueous sodium hydroxide solution, 4 g of methacrylic acid, 118 g of n-butyl acrylate, 60 g of methyl methacrylate, 16 g of ethyl acrylate and 1.6 g of n-octyltrimethoxysilane, and, as feed 2, a mixture of 161 g of deionized water, 8.5 g of a 10% strength by weight aqueous sodium hydroxide solution and 2.4 g of sodium peroxodisulfate. After the heating operation, the two feeds were metered in continuously over the course of 2 hours, beginning at the same time, at the same volume flow rates. To conclude, the reaction mixture was stirred at reaction temperature for 30 minutes and, finally, was cooled to room temperature.

The aqueous composite-particle dispersion thus obtained had a solids content of 18.8% by weight, based on the total weight of the aqueous composite-particle dispersion.

The solids content was generally determined by drying about 1 g of the composite-particle dispersion to constant weight in an open aluminum crucible having an internal diameter of approximately 3 cm in a drying oven at 150° C. To determine the solids content, two separate measurements were conducted in each case and the corresponding average was formed.

The pH of the composite-particle dispersion was 9.4.

The pH was generally determined at room temperature by means of a Micropal pH538 device from Wissenschaftlich-Technische-Werkstätten (WTW) GmbH.

The size of the composite particles was determined generally by the method of quasielastic light scattering (DIN ISO 13321) using a High Performance Particle Sizer (HPPS) from Malvern Instruments Ltd. An average particle size of 118 nm was found.

Example 2

Example 2 was prepared as for example 1 with the difference that 0.2 g of n-octyltrimethoxysilane was included in the initial charge and 2.7 g of n-octyltrimethoxysilane were metered as part of the monomer emulsion.

The aqueous composite-particle dispersion thus obtained had a solids content of 19.0% by weight, based on the total weight of the aqueous composite-particle dispersion.

The pH of the composite-particle dispersion was 9.1.

An average particle size of 128 nm was found.

Example 3

Example 3 was prepared as for example 1 with the difference that 0.1 g of n-octyltrimethoxysilane and 0.1 g of 3-methacryloyloxypropyltrimethoxysilane were included in the initial charge and 1.5 g of n-octyltrimethoxysilane and 1.0 g of 3-methacryloyloxypropyltrimethoxysilane were metered as part of the monomer emulsion.

The aqueous composite-particle dispersion thus obtained had a solids content of 19.0% by weight, based on the total weight of the aqueous composite-particle dispersion.

The pH of the composite-particle dispersion was 8.9.

An average particle size of 122 nm was found.

Using the analytical ultracentrifuge it was also possible to detect that the composite particles obtained had a homogeneous density of 1.13 g/cm$^3$. No free particles of phyllosilicate solid were detectable (cf., on this point, also S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175).

Comparative Example 1

Comparative example 1 was prepared as for example 1 with the difference that the total amount of n-octyltrimethoxysilane was metered in feed 1 as part of the monomer emulsion.

The aqueous composite-particle dispersion thus obtained had a solids content of 18.3% by weight, based on the total weight of the aqueous composite-particle dispersion.

The pH of the composite-particle dispersion was 8.9.

An average particle size of 115 nm was found.

A fraction of approximately 2% by weight of free phyllosilicates, based on the solids content of the aqueous composite-particle dispersion, was detectable using the analytical ultracentrifuge.

Comparative Example 2

Comparative example 2 was prepared as for example 1 with the difference that no n-octyltrimethoxysilane was used.

The aqueous composite-particle dispersion thus obtained had a solids content of 18.5% by weight, based on the total weight of the aqueous composite-particle dispersion.

The pH of the composite-particle dispersion was 9.0.

An average particle size of 103 nm was found.

A fraction of approximately 10% by weight of free phyllosilicates, based on the solids content of the aqueous composite particle dispersion, were detectable using the analytical ultracentrifuge.

Comparative Example 3

Comparative example 3 was prepared as for example 1 with the difference that the total amount of n-octyltrimethoxysilane was metered in over the course of 1 minute to the phyllosilicate.

The aqueous composite-particle dispersion thus obtained had a solids content of 18.7% by weight, based on the total weight of the aqueous composite-particle dispersion.

The pH of the composite-particle dispersion was 8.8.

An average particle size of 117 nm was found.

A fraction of approximately 10% by weight of free phyllosilicates, based on the solids content of the aqueous composite particle dispersion, were detectable using the analytical ultracentrifuge.

b) Performance Investigations

Breaking Strength and Breaking Elongation

Films were produced from the aqueous composite-particle dispersions of examples 1, 2, and 3 and also of comparative examples 1 to 3, and their breaking strength and breaking extension were ascertained.

The fracture-mechanical properties of the abovementioned composite-particle dispersion films were determined in a tensile test to DIN 53504. The thickness of the dispersion films was 0.4 to 0.5 mm and the take-off speed was 25.4 mm/min. Before the beginning of the investigation, the corresponding amounts of the composite-particle dispersions were applied to a Teflon support and, for the formation of the dispersion films, were stored for 14 days in a controlled-climate chamber at 23° C. and 50% relative humidity. The composite particle dispersion films obtained were then removed from the Teflon support. The figures reported in the table below are in each case the average values from 5 separate measurements in each case.

| Example | Breaking strength BS (N/mm$^2$) | Breaking extension BE (%) | Toughness (BS × BE) |
|---|---|---|---|
| 1 | 2.0 | 820 | 1640 |
| 2 | 1.9 | 850 | 1615 |
| 3 | 2.6 | 770 | 2002 |
| Comparative example 1 | 1.7 | 760 | 1292 |

| Example | Breaking strength BS (N/mm²) | Breaking extension BE (%) | Toughness (BS × BE) |
|---|---|---|---|
| Comparative example 2 | 1.4 | 740 | 1036 |
| Comparative example 3 | 1.3 | 750 | 975 |

The invention claimed is:

1. A process which comprises preparing an aqueous dispersion comprising composite particles comprising addition polymer and finely divided inorganic solid, in which process ethylenically unsaturated monomers are dispersely distributed in an aqueous medium and polymerized by free-radical aqueous emulsion polymerization initiated by at least one free-radical polymerization initiator in the presence of at least one dispersely distributed, finely divided inorganic solid and at least one dispersant, wherein
   a) the inorganic solid has an average particle diameter of >0 nm and ≦100 nm,
   b) 1 to 1000 parts by weight of inorganic solid are used per 100 parts by weight of monomers,
   c) 0.01 to 10 parts by weight of a silane compound are used per 100 parts by weight of monomers, the silane compound having at least one Si—OH group or at least one functional group which is hydrolyzed in deionized water at a temperature ≦100° C. to form an Si—OH or an Si—O—Si group, and the silane compound having no free-radically copolymerizable ethylenically unsaturated group, and
   d) at least a portion of the inorganic solid is included in an initial charge in an aqueous polymerization medium in the form of an aqueous dispersion of solids, then
   e) at least a portion of the silane compound but less than 100% thereof is metered into the aqueous polymerization medium over a period of ≧5 and ≦240 minutes, subsequently
   f) optionally ≦20% by weight of the monomers are added to the aqueous polymerization medium and free-radically polymerized, and subsequently
   g) any remainder of the inorganic solid, the remainder of the silane compound, and any remainder or the total amount of the monomers are metered into the aqueous polymerization medium under polymerization conditions.

2. The process according to claim 1, wherein in step d) ≧50% by weight of the inorganic solid is included in the initial charge.

3. The process according to claim 1, wherein in step d) the total amount of the inorganic solid is included in the initial charge.

4. The process according to claim 1, wherein step e) is conducted at a temperature ≧50 and ≦100° C.

5. The process according to claim 1, wherein in step e) ≧5% and ≦70% by weight of the silane compound are metered in.

6. The process according to claim 1, wherein the inorganic solid is silicon-containing.

7. The process according to claim 1, wherein pyrogenic (fumed) silica, colloidal silica and/or a phyllosilicate is the inorganic solid.

8. The process according to claim 1, wherein at the end of step e) the aqueous polymerization medium contains ≦10% by weight of organic solvent, based on the total amount of water.

9. The process according to claim 1, wherein the silane compound is a compound of the general formula I

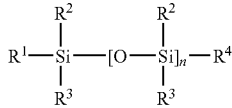

(I)

with
R¹ to R⁴ being OH, $C_1$-$C_4$ alkoxy, halogen
unsubstituted or substituted $C_1$-$C_{30}$ alkyl,
unsubstituted or substituted $C_5$-$C_{15}$ cycloalkyl,
$C_1$-$C_4$ alkylene-[O—$CH_2CH_2$]$_x$—O—Z,
unsubstituted or substituted $C_6$-$C_{10}$ aryl, or
unsubstituted or substituted $C_7$-$C_{12}$ aralkyl,
Z being hydrogen, or $C_1$-$C_4$ alkyl
n being an integer from 0 to 5 and
x being an integer from 1 to 10,
with at least one of radicals R¹ to R⁴ being OH, $C_1$-$C_4$ alkoxy or halogen,
or
a compound of the general formula II

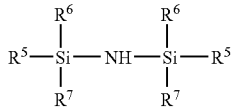

(II)

with
R⁵ to R⁷ being unsubstituted or substituted $C_1$-$C_{30}$ alkyl,
unsubstituted or substituted $C_5$-$C_{15}$ cycloalkyl,
unsubstituted or substituted $C_6$-$C_{10}$ aryl, or
unsubstituted or substituted $C_7$-$C_{12}$ aralkyl.

10. The process according to claim 1, wherein the silane compound is selected from the group consisting of methyltrimethoxysilane, n-propyltrimethoxysilane, n-octyltrimethoxysilane, n-decyltriethoxysilane, n-hexadecyltrimethoxysilane, dimethyldimethoxysilane, trimethylmethoxysilane, 3-acetoxypropyltrimethoxy-silane, 3-aminopropyltrimethoxysilane, 3-chloropropyltrimethoxysilane, 3-glycidyloxypropyltrimethoxysilane, 3-mercaptopropyltrimethoxysilane, phenyltrimethoxysilane and 1,1,1,3,3,3-hexamethyldisilazane.

11. The process according to claim 1, wherein an anionic and/or non-ionic emulsifier is used as dispersant.

12. The process according to claim 1, wherein the composition of the monomers is chosen so that polymerization thereof results in an addition polymer having a glass transition temperature <60° C.

13. An aqueous dispersion of composite particles, obtained by a process according to claim 1.

14. A binder, a protective coat, or a component in adhesives, cement or mortar formulations, and in medical diagnostics comprising the aqueous dispersion of composite particles according to claim 13.

15. A composite-particle powder obtained by drying an aqueous dispersion of composite particles according to claim 13.

16. The process according to claim 1, wherein the period is ≧30 and ≦120 minutes.

17. The process according to claim 1, wherein the period is ≧45 and ≦90 minutes.

18. The process according to claim 1, wherein in step e) ≧10% and ≦50% by weight of the silane compound are metered in.

* * * * *